United States Patent
Yang et al.

(10) Patent No.: US 7,333,454 B2
(45) Date of Patent: Feb. 19, 2008

(54) SYSTEM AND ASSOCIATED MOBILE NODE, FOREIGN AGENT AND METHOD FOR LINK-LAYER ASSISTED MOBILE IP FAST HANDOFF

(75) Inventors: Jianhao Michael Yang, San Diego, CA (US); Sarvesh Asthana, San Diego, CA (US); Krishna Kumar, San Diego, CA (US)

(73) Assignee: Nokia Corporation, Espoo (FI)

( * ) Notice: Subject to any disclaimer, the term of this patent is extended or adjusted under 35 U.S.C. 154(b) by 463 days.

(21) Appl. No.: 10/880,385

(22) Filed: Jun. 29, 2004

(65) Prior Publication Data

US 2005/0286471 A1    Dec. 29, 2005

(51) Int. Cl.
*H04Q 7/00* (2006.01)
(52) U.S. Cl. ...................................... 370/331
(58) Field of Classification Search ................ 370/331
See application file for complete search history.

(56) References Cited

U.S. PATENT DOCUMENTS

| | | | |
|---|---|---|---|
| 6,736,349 B1 | 5/2004 | Boisdon et al. | |
| 7,161,913 B2* | 1/2007 | Jung | 370/331 |
| 2002/0021681 A1* | 2/2002 | Madour | 370/331 |
| 2002/0141360 A1 | 10/2002 | Baba et al. | |
| 2003/0104814 A1 | 6/2003 | Gwon et al. | |
| 2003/0125027 A1 | 7/2003 | Gwon et al. | |
| 2004/0081122 A1 | 4/2004 | Koodli et al. | |
| 2005/0208942 A1 | 9/2005 | Pekonen et al. | |

FOREIGN PATENT DOCUMENTS

WO    WO 01/74108 A1    10/2001

OTHER PUBLICATIONS

W. Simpson; *The Point-to-Point Protocol (PPP)*; Jul. 1994; 54 pages.
*Data Service Options for Spread Spectrum Systems: cdma2000 High Speed Packet Data Service Option 33*; 3rd Generation Partnership Project 2 "3GPP2"; Aug. 2000; 62 pages; 3GPP2 C-S0017-0-2.12; Version 2; © 3GPP2 2000.
C. Perkins: *IP Mobility Support for IPv4*; Jan. 2002; 98 pages.

(Continued)

*Primary Examiner*—William Trost
*Assistant Examiner*—Marivelisse Santiago-Cordero
(74) *Attorney, Agent, or Firm*—Alston & Bird LLP

(57) ABSTRACT

A system for handing off a mobile node includes a mobile node and a target foreign agent. To effectuate a handoff of the mobile node from an anchor foreign agent to the target foreign agent, a tunnel can be established therebetween such that data packet(s) sent between the mobile node and a correspondent node pass between the target foreign agent and the anchor foreign agent through the tunnel. After the tunnel is established, the mobile node can register with the target foreign agent to thereby bind the mobile node to the target foreign agent such that data packet(s) sent between the mobile node and the correspondent node pass through the target foreign agent to the correspondent node independent of the anchor foreign agent and the tunnel. Thereafter, the target foreign agent can close the tunnel between the target foreign agent and the anchor foreign agent.

16 Claims, 6 Drawing Sheets

OTHER PUBLICATIONS

*cdma2000 Wireless IP Network Standard: Packet Data Mobility and Resource Management*; 3rd Generation Partnership Project 2 "3GPP2"; Aug. 2003; 30 pages; 3GPP2 X.S0011-003-C; Version 1.0.0.

*cdma2000 Wireless IP Network Standard: Simple IP and Mobile IP Access Services*; 3rd Generation Partnership Project 2 "3GPP2"; 44 pages; Aug. 2003; 3GPP2 X.S001-002-C; Version 1.0.0.

Rajeev Kookli; *Fast Handovers for mobile IPv6 draft-ietf-mobileip-fast-mipv6-08.txt*; Oct. 2003; 35 pages.

*Interoperability Specification (IOS) for cdma2000 Access Network Interfaces—Part 3 Features (3G-IOSv4.3)*; 3rd Generation Partnership Project 2 "3GPP2"; Jul. 2003; 338 pages; 3GPP2 A.S0013-A; Version 2.0.1.

* cited by examiner

SYSTEM AND ASSOCIATED MOBILE NODE, FOREIGN AGENT AND METHOD FOR LINK-LAYER ASSISTED MOBILE IP FAST HANDOFF

FIELD OF THE INVENTION

The present invention generally relates to systems and methods of handing off a mobile node from one router to another and, more particularly, relates to systems and methods of link-layer assisted fast handoff of a mobile node from one router to another.

BACKGROUND OF THE INVENTION

The mobile Internet Protocol (IP) enables a mobile terminal to move freely from one point of connection to another in various networks it visits along its route. In particular, the MIP protocol describes those actions that enable a mobile terminal to maintain connectivity during a handover from one access router to another access router. A typical handover of the mobile terminal, however, requires link-layer and IP-layer signaling. And during this signaling phase, the mobile terminal is unable to send or receive data packets. This time period is referred to as handoff delay. In many situations, the handoff delay may be unacceptable to support real-time, or otherwise delay sensitive network traffic. Thus, seamless mobility management techniques can be required for such services. In this regard, seamless mobility management can reduce or eliminate service interruption, packet loss and handoff delay, thus increasing the quality of service (QoS).

As will be appreciated, seamless handoff can be achieved through fast handoff and context transfer. Generic fast handoff mechanisms, however, only reduce the IP-layer signaling delays and do not address the link-layer delays. In this regard, there is currently no standardized technique to reduce the handoff delay when a mobile terminal moves from one link-layer technology to another. For example, a mobile terminal moving from a wireless local area network (WLAN) to a CDMA network still experiences latency due to physical-layer and link-layer signalling during handoff from one network to the other.

As will also be appreciated, different networks can be categorized as either fast-access networks (e.g., WLAN, WiMAX, Bluetooth, etc.) or slow-access networks (e.g., CDMA, GPRS, 1XEV-DO, etc.). Thus, when a mobile terminal roams from one network to another, four possibilities exist with respect to the access speed of the networks, namely, the mobile terminal can roam (1) from a fast-access network to another fast-access network, (2) from a slow-access network to a fast-access network, (3) from a fast-access network to a slow-access network, or (4) from a slow-access network to another slow-access network. And within roaming from a slow-access network to another slow-access network, the mobile terminal can more particularly roam (a) from one slow-access network to another of the same type of slow-access network (e.g., inter-PDSN handoff for a CDMA network), or (b) from a slow-access network to another, different type of slow-access network (e.g., from CDMA to GPRS).

Link-layer delay during MIP fast handoff is generally not a concern for mobile terminals roaming from a fast-access network to another fast-access network, or from a slow-access network to a fast-access network, since the link-layer setup for such handoffs is typically very fast (e.g., up to several hundred milliseconds). However, for mobile terminals roaming from a fast-access network to a slow-access network, or a slow-access network to another slow-access network, link-layer assistance can be beneficial to eliminate or at least decrease the delay due to link-layer set up.

SUMMARY OF THE INVENTION

In light of the foregoing background, embodiments of the present invention provide an improved system and associated mobile node, agent and method for link-layer assisted fast handoff from one point of connection to another in various networks the terminal visits along its route. Embodiments of the present invention are capable of handing off a terminal from one point of connection to another, while reducing link-layer delay otherwise associated with such handoff. More particularly, embodiments of the present invention are capable of reducing link-layer delay when a mobile terminal is handed off from a slow-access network to another slow-access network, including from one slow-access network to another of the same type of slow-access network, and from a slow-access network to another, different type of slow-access network.

According to one aspect of the present invention, a system is provided for handing off a mobile node. The system includes a mobile node and a target agent (e.g., target home or foreign agent), and can also include a correspondent node. The mobile node is capable of communicating with an anchor agent (e.g., target home or foreign agent), and also capable of being handed off from the anchor agent. To effectuate the handoff, the target agent is capable of establishing a tunnel between the target agent and the anchor agent such that data packet(s) sent between the mobile node and the correspondent node pass between the target agent and the anchor agent through the tunnel. By establishing the tunnel, the system is capable of ensuring that little, if any, data is lost or delayed during a subsequent mobile IP handoff procedure. Thus, after the tunnel is established, the mobile node is capable of registering with the target agent to thereby bind the mobile node to the target agent such that data packet(s) sent between the mobile node and the correspondent node pass through the target agent to the correspondent node independent of the anchor agent and the tunnel.

Before the mobile node registers with the target agent, the target agent can be further capable of receiving link-layer context information for the mobile node from the anchor agent, such as when handing off the mobile node from a an anchor agent operating in a slow-access network to a target agent operating the same type of slow-access network. In such instances, the link-layer context information can be received across the tunnel. Alternatively, the mobile node can be capable of establishing a link-layer connection with the target agent, such as when handing off the mobile node from an anchor agent operating in a slow-access network to a target agent operating the same or different type of slow-access network. In such instances, establishment of the link-layer connection includes the mobile node negotiating link-layer context information with the target agent. After registering with the target agent, however, the target agent can close the tunnel between the target agent and the anchor agent.

After registering the mobile node, but typically before closing the tunnel, however, the target agent can be capable of receiving an incoming data packet from the correspondent node independent of the anchor agent. In such instances, the target agent can be capable of activating a link-layer context, and thereafter forwarding the data packet to the mobile node.

Additionally, the target agent can be capable of receiving an outgoing data packet from the mobile node. The target agent can then be capable of forwarding the data packet to the correspondent node independent of the anchor agent and the tunnel, and in accordance with a link-layer context at the target agent, the link-layer context having been activated by the target agent. More particularly, in accordance with an optional aspect of the present invention, the target agent can be capable of receiving one or more outgoing data packets. For those data packets, then, the target agent can be capable of passing the data packet(s) through the tunnel to the anchor agent such that the anchor agent is capable of thereafter forwarding the data packet(s) to the correspondent node. The data packet(s) can be passed through the tunnel until the target agent identifies a data packet including framing information representing a boundary of a link-layer frame. Thereafter, the target agent can be capable of passing a first portion of the identified data packet to the anchor agent through the tunnel such that the anchor agent can thereafter forward the first portion to the correspondent node. Additionally, the target agent can be capable of passing a second portion of the identified data packet to the correspondent node independent of the anchor agent and the tunnel. In such instances, the first portion represents an end of a data transmission and the second portion represents a beginning of a subsequent data transmission. After passing the first portion, and more typically after passing both the first and second portions, the target agent can close the tunnel.

According to other aspects of the present invention, a mobile node, agent and method are provided for handing off the mobile node. Embodiments of the present invention therefore provide an improved system and associated mobile node, agent and method for handing off a mobile node. As indicated above, and explained below, embodiments of the present invention are capable of handing off a terminal from one point of connection to another, while reducing link-layer delay otherwise associated with such handoff. In this regard, by establishing a tunnel between the target agent and the anchor agent data packet(s) sent between the mobile node and the correspondent node can pass between the target agent and the anchor agent through the tunnel. Thus, link-layer delay due to link-layer and IP-layer signaling can be reduced, if not eliminated, while handoff of the mobile node is completed, as the mobile node would otherwise be unable to send or receive data packets during such link-layer and IP-layer signaling. Then, after registering the mobile node with the target agent, the tunnel can be closed as data packets between the mobile node and the correspondent node can pass through the target agent independent of the anchor agent and the tunnel between the target agent and the anchor agent. As such, the system, mobile node, agent and method of embodiments of the present invention solve the problems identified by prior techniques and provide additional advantages, such as by reducing network resource usage by releasing the tunnel, and by eliminating an extra routing hop between the target agent and the anchor agent.

BRIEF DESCRIPTION OF THE DRAWINGS

Figure 1:
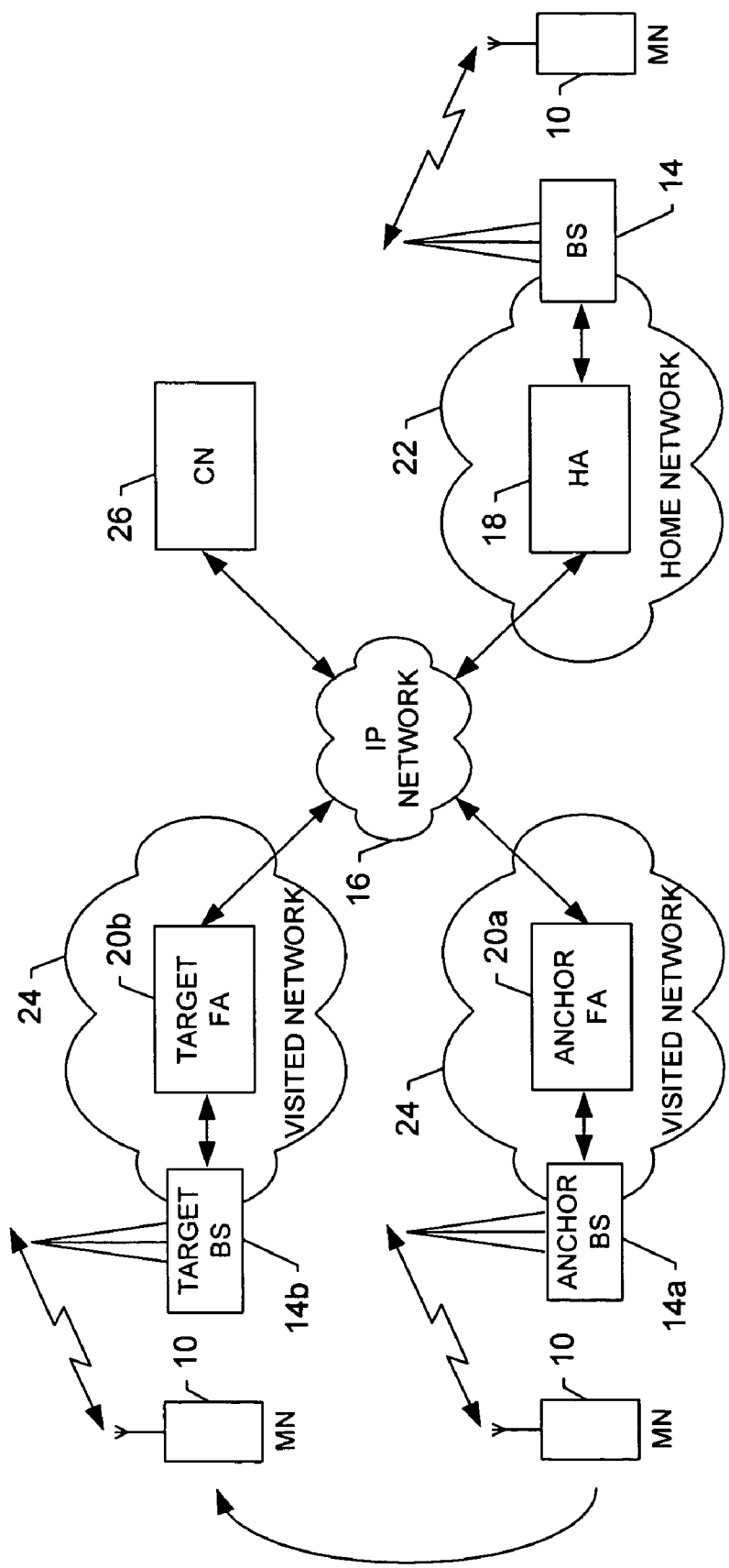
Figure 2:
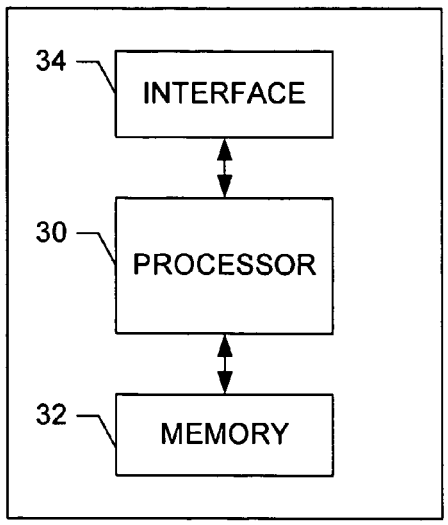
Figure 3:
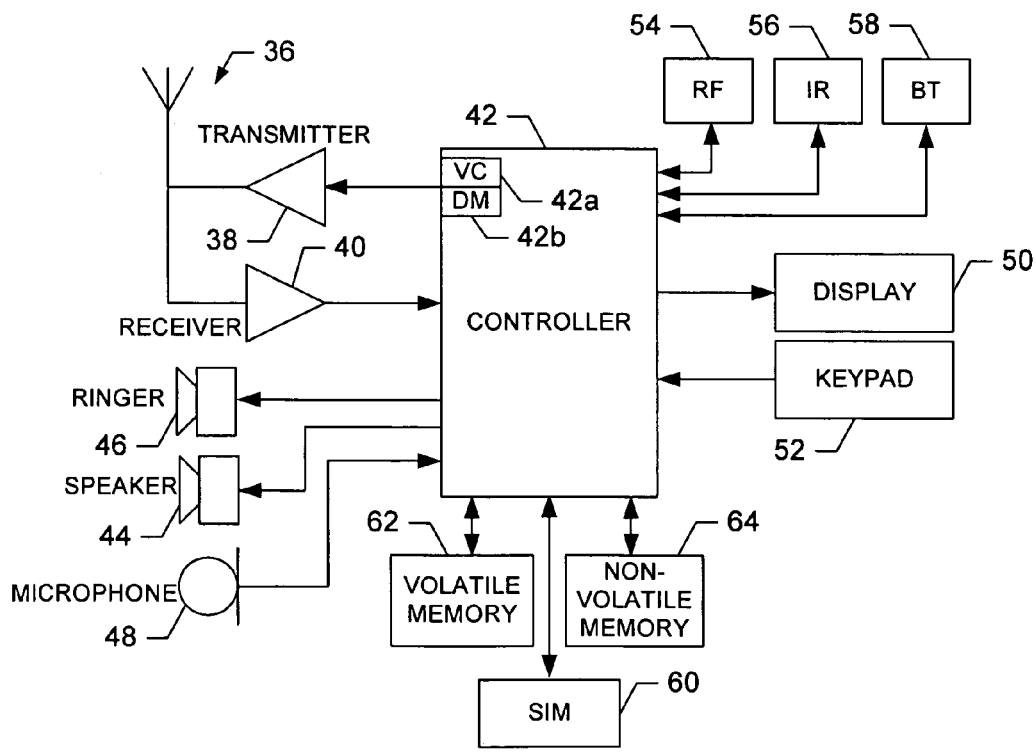
Figure 4:
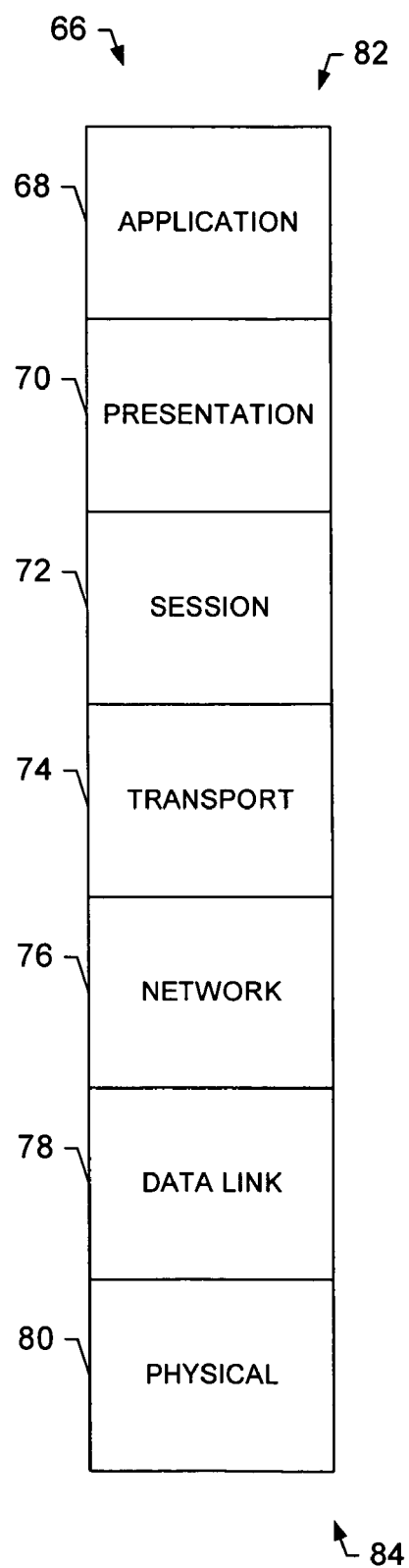
Figure 5:
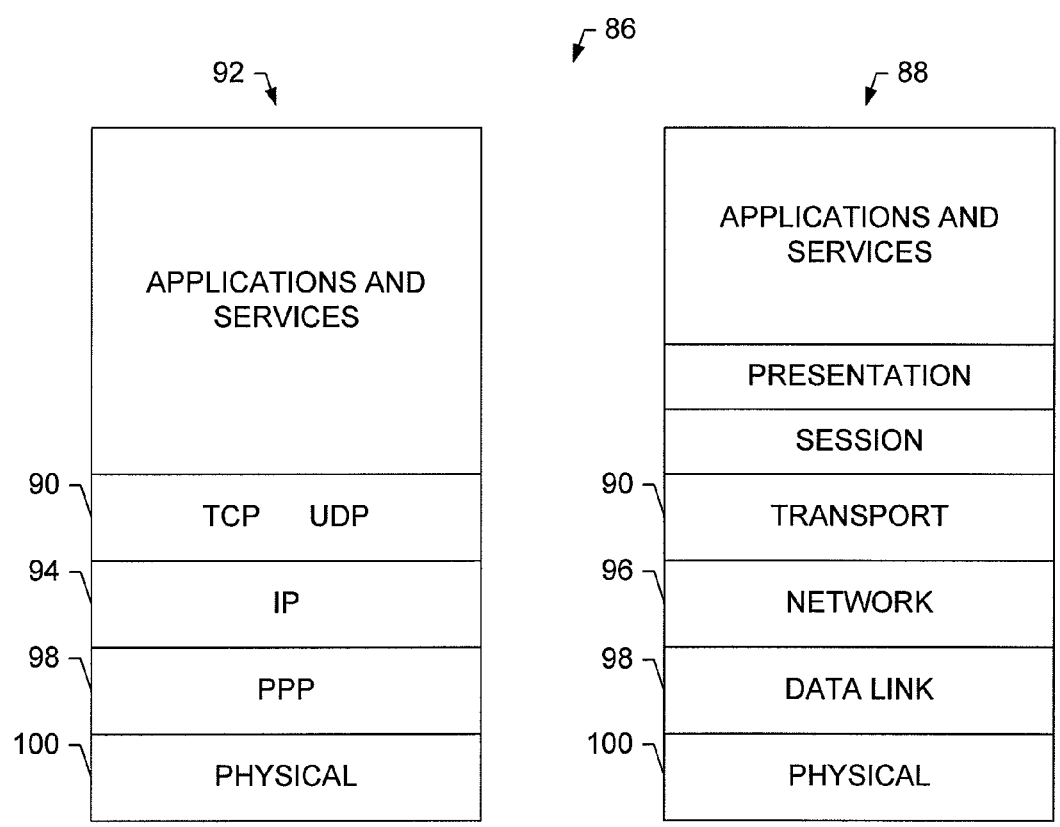
Figure 6:
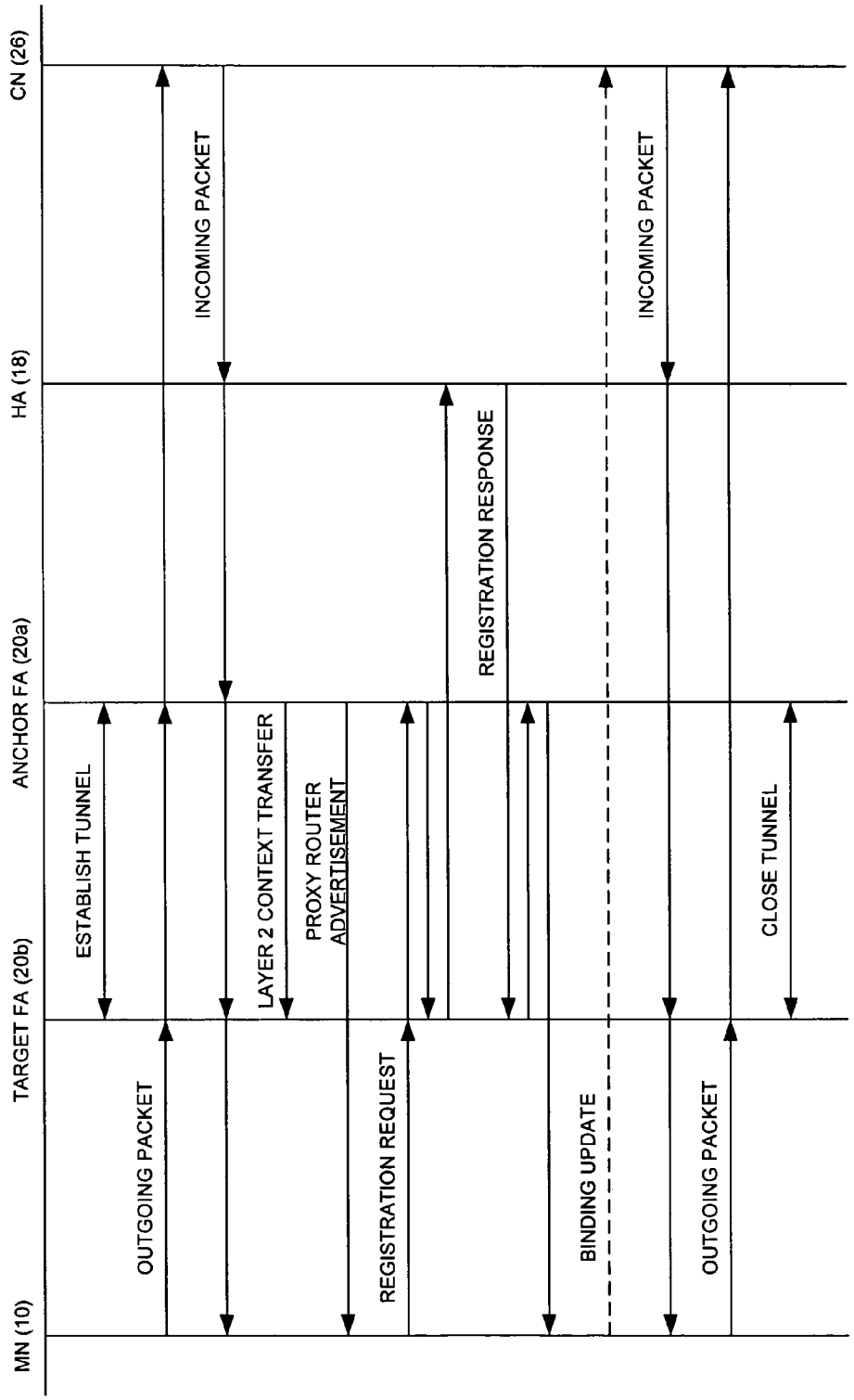
Figure 7:
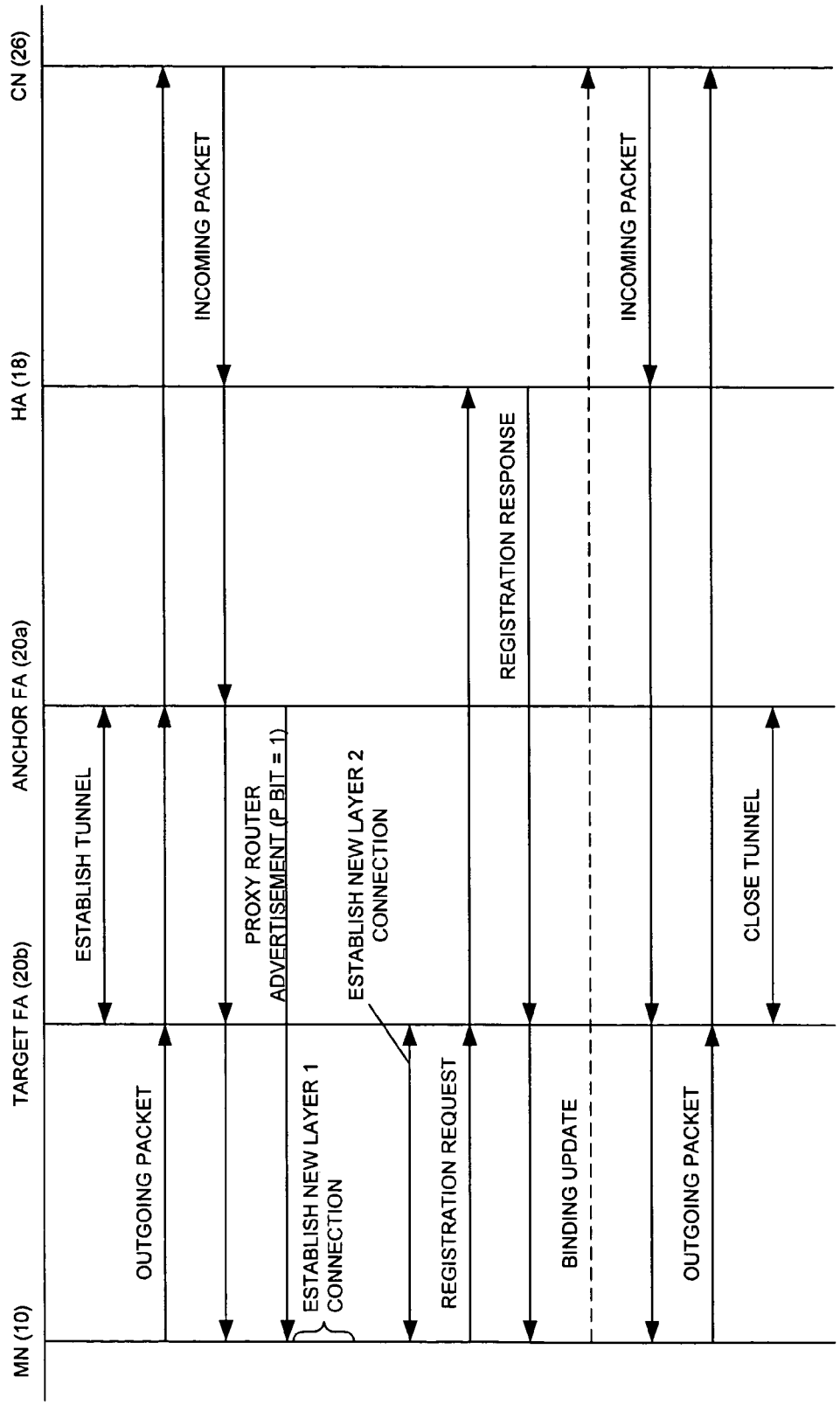

Having thus described the invention in general terms, reference will now be made to the accompanying drawings, which are not necessarily drawn to scale, and wherein:

FIG. 1 is a block diagram of one type of mobile node and system that would benefit from embodiments of the present invention;

FIG. 2 is a schematic block diagram of an entity capable of operating as a mobile node, home agent, foreign agent and/or correspondent node, in accordance with embodiments of the present invention;

FIG. 3 is a schematic block diagram of a mobile node, in accordance with one embodiment of the present invention;

FIG. 4 illustrates a multi-layer protocol stack of a node in accordance with one embodiment of the present invention where the protocol stack comprises the OSI model including seven layers;

FIG. 5 illustrates a comparison of the OSI functionality of a node in accordance with an embodiment of the present invention, and the generic OSI model;

FIG. 6 is a control flow diagram illustrating communication between various entities performing a method of handing off a mobile node from a current, anchor foreign agent to a new, target foreign agent, in accordance with one embodiment of the present invention; and FIG. 7 is a control flow diagram illustrating communication between various entities performing a method of handing off a mobile node from a current, anchor foreign agent to a new, target foreign agent, in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, the system can include a mobile node (MN) 10 capable of transmitting signals to and for receiving signals from base sites or base stations (BS) 14, two of which are shown in FIG. 1 (shown and described below as including an anchor BS 14*a* and a target BS 14*b* during fast handoff). The base station is a part of one or more cellular or mobile networks that each include elements required to operate the network, such as a mobile switching center (MSC) (not shown). As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MN 10 can also be coupled to a data network. For example, the BS 14 can be coupled to a data network, such as a local area network (LAN), a metropolitan area network (MAN), and/or a wide area network (WAN). In one typical embodiment, the BS is coupled to a gateway, which is coupled to the data network, such as an Internet Protocol (IP) network 16. The gateway can comprise any of a number of different entities capable of providing network connectivity between the MN and other nodes directly or indirectly coupled to the data network. As will be appreciated, the gateway can be described in any of a number of different manners, such as a home agent (HA) 18, foreign agent (FA) 20 (shown and described below as including an anchor FA 20*a* and a target FA 20*b* during fast handoff), packet data serving node (PDSN), access router or the like. In this regard, as defined in the MIP (MIP) protocol, a HA comprises a router within a home network 22 of the MN. The HA is capable of tunneling data for delivery to the MN when the MN is away from home, and can maintain current location information for the MN. A FA, on the other hand, comprises router within a visited network 24 of the MN. The FA provides routing services to the MN while the MN is registered with the visited network. In operation, the FA detunnels data from the HA, and delivers the data to the MN. Then, for data sent from a MN registered with the visited network, the FA can serve as a default router.

The other nodes coupled to the MN 10 via the IP network 16 can comprise any of a number of different devices, systems or the like capable of communicating with the MN in accordance with embodiments of the present invention. The other nodes can comprise, for example, personal computers, server computers or the like. Additionally or alternatively, for example, one or more CNs can comprise, other MNs, such as mobile telephones, portable digital assistants (PDAs), pagers, laptop computers, or the like. As described herein, a node capable of communicating with the MN via the IP network is referred to as a correspondent node (CN) 26, one of which is shown in FIG. 1.

Although not every element of every possible network is shown and described herein, it should be appreciated that the MN 10 can be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. Additionally or alternatively, mobile network(s) can be capable of supporting communication in accordance with any one or more of a number of different digital broadcast networks, such as Digital Video Broadcasting (DVB) networks including DVB-T (DVB-Terrestrial) and/or DVB-H (DVB-Handheld), Integrated Services Digital Broadcasting (ISDB) networks including ISDB-T (ISDB-Terrestrial), or the like.

More particularly, for example, the MN 10 can be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Further, one or more of the network(s) can be capable of supporting enhanced 3G wireless communication protocols such as 1XEV-DO (TIA/EIA/IS-856) and 1XEV-DV. Some narrow-band AMPS (NAMPS), as well as TACS, network(s) may also benefit from embodiments of the present invention, as should dual or higher mode MNs (e.g., digital/analog or TDMA/CDMA/analog phones).

Referring now to FIG. 2, a block diagram of an entity capable of operating as a MN 10, HA 18, FA 20 and/or CN 26 is shown in accordance with one embodiment of the present invention. Although shown as separate entities, in some embodiments, one or more entities may support one or more of a MN, HA, FA and/or CN, logically separated but co-located within the entit(ies). For example, a single entity may support a logically separate, but co-located, HA and CN. Also, for example, a single entity may support a logically separate, but co-located FA and CN.

As shown, the entity capable of operating as a MN 10, HA 18, FA 20 and/or CN 26 can generally include a processor 30 connected to a memory 32. The processor can also be connected to at least one interface 34 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

Reference is now made to FIG. 3, which illustrates one type of MN 10 that would benefit from embodiments of the present invention. It should be understood, however, that the MN illustrated and hereinafter described is merely illustrative of one type of MN that would benefit from the present invention and, therefore, should not be taken to limit the scope of the present invention. While several embodiments of the MN are illustrated and will be hereinafter described for purposes of example, other types of MNs, such as portable digital assistants (PDAs), pagers, laptop computers and other types of electronic systems, can readily employ the present invention.

As shown, in addition to an antenna 36, the MN 10 can include a transmitter 38, receiver 40, and controller 42 or other processor that provides signals to and receives signals from the transmitter and receiver, respectively. These signals include signaling information in accordance with the air interface standard of the applicable cellular system, and also user speech and/or user generated data. In this regard, the MN can be capable of operating with one or more air interface standards, communication protocols, modulation types, and access types. More particularly, the MN can be capable of operating in accordance with any of a number of first generation (1G), second generation (2G), 2.5G and/or third-generation (3G) communication protocols or the like. For example, the MN may be capable of operating in accordance with 2G wireless communication protocols IS-136 (TDMA), GSM, and IS-95 (CDMA). Also, for example, the MN may be capable of operating in accordance with 2.5G wireless communication protocols GPRS, Enhanced Data GSM Environment (EDGE), or the like. Further, for example, the MN may be capable of operating in accordance with 3G wireless communication protocols such as Universal Mobile Telephone System (UMTS) network employing Wideband Code Division Multiple Access (WCDMA) radio access technology. The MN can also be capable of operating in accordance with enhanced 3G wireless communication protocols such as 1XEV-DO (TIA/EIA/

IS-856) and 1XEV-DV. Some narrow-band AMPS (NAMPS), as well as TACS, MNs may also benefit from the teaching of this invention, as should dual or higher mode phones (e.g., digital/analog or TDMA/CDMA/analog phones).

It is understood that the controller 42 includes the circuitry required for implementing the audio and logic functions of the MN 10. For example, the controller may be comprised of a digital signal processor device, a microprocessor device, and various analog-to-digital converters, digital-to-analog converters, and other support circuits. The control and signal processing functions of the MN are allocated between these devices according to their respective capabilities. The controller can additionally include an internal voice coder (VC) 42a, and may include an internal data modem (DM) 42b. Further, the controller may include the functionally to operate one or more software programs, which may be stored in memory (described below). For example, the controller may be capable of operating a connectivity program, such as a conventional Web browser. The connectivity program may then allow the MN to transmit and receive Web content, such as according to HTTP and/or the Wireless Application Protocol (WAP), for example.

The MN 10 also comprises a user interface including a conventional earphone or speaker 44, a ringer 46, a microphone 48, a display 50, and a user input interface, all of which are coupled to the controller 42. The user input interface, which allows the MN to receive data, can comprise any of a number of devices allowing the MN to receive data, such as a keypad 52, a touch display (not shown) or other input device. In embodiments including a keypad, the keypad includes the conventional numeric (0-9) and related keys (#, *), and other keys used for operating the MN. Although not shown, the MN can include a battery, such as a vibrating battery pack, for powering the various circuits that are required to operate the MN, as well as optionally providing mechanical vibration as a detectable output.

The MN 10 can also include one or more means for sharing and/or obtaining data. For example, the MN can include a short-range radio frequency (RF) transceiver or interrogator 54 so that data can be shared with and/or obtained from electronic devices in accordance with RF techniques. The MN can additionally, or alternatively, include other short-range transceivers, such as, for example an infrared (IR) transceiver 56, and/or a Bluetooth (BT) transceiver 58 operating using Bluetooth brand wireless technology developed by the Bluetooth Special Interest Group. The MN can therefore additionally or alternatively be capable of transmitting data to and/or receiving data from electronic devices in accordance with such techniques. Although not shown, the MN can additionally or alternatively be capable of transmitting and/or receiving data from electronic devices according to a number of different wireless networking techniques, including WLAN techniques such as IEEE 802.11, WiMAX techniques such as IEEE 802.16 or the like.

The MN 10 can further include memory, such as a subscriber identity module (SIM) 60, a removable user identity module (R-UIM) or the like, which typically stores information elements related to a mobile subscriber. In addition to the SIM, the MN can include other removable and/or fixed memory. In this regard, the MN can include volatile memory 62, such as volatile Random Access Memory (RAM) including a cache area for the temporary storage of data. The MN can also include other non-volatile memory 64, which can be embedded and/or may be removable. The non-volatile memory can additionally or alternatively comprise an EEPROM, flash memory or the like. The memories can store any of a number of software applications, instructions, pieces of information, and data, used by the MN to implement the functions of the MN. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the MN.

As explained in the background section, MIP enables a MN 10 to move freely from one point of connection to another in various networks it visits along its route. In particular, the MIP protocol describes those actions that enable a MN to maintain connectivity during a handover from one access router to another access router. Briefly, MIP enables the mobile node to be identified by its home address, regardless of its current point of attachment to the IP network 16. When the MN is in a visiting network 24 away from the home network 22, it is also associated with a care-of-address, which provides information about the MN's current location. Typically, during a handoff between FAs 20 the care-of-address changes but the home address remains the same.

As also explained in the background section, a typical handover of the MN 10 requires link-layer and IP-layer signaling, during which the MN is unable to send or receive data packets. In many situations, such handoff delay may be unacceptable to support real-time, or otherwise delay sensitive network traffic. Thus, seamless mobility management techniques can be required for such services. In this regard, seamless mobility management can reduce or eliminate service interruption, packet loss and handoff delay, thus increasing the quality of service (QoS). And whereas seamless handoff can be achieved through fast handoff and context transfer, generic fast handoff mechanisms only reduce the IP-layer signaling delays and do not address the link-layer delays.

As explained in greater detail below, embodiments of the present invention are therefore capable of link-layer assisted fast handoff from one point of connection to another in various networks the MN 10 visits along its route. Embodiments of the present invention are capable of handing off a MN from one point of connection to another, while reducing link-layer delay otherwise associated with such handoff. More particularly, embodiments of the present invention are capable of reducing link-layer delay when a MN is handed off from a slow-access network to another slow-access network, including from one slow-access network to the same type of slow-access network, and from a slow-access network to a different type of slow-access network.

Before describing the method of link-layer fast handoff in accordance with various embodiments of the present invention, reference is made to FIGS. 4 which illustrate a protocol stack of a node (e.g., MN 10, CN 26, etc.) and a comparison of the protocol stack of the node in accordance with embodiments of the present invention, and the generic Open Systems Interconnection (OSI) model. In FIGS. 4 and 5, the protocol stack may be implemented in software, hardware, firmware or combinations of the same. More particularly, FIG. 4 illustrates the OSI model 66 which includes seven layers, including an application layer 68, presentation layer 70, session layer 72, transport layer 74, network layer 76, data link layer 78 and physical layer 80. The OSI model was developed by the International Organization for Standardization (ISO) and is described in ISO 7498, entitled: *The OSI Reference Model,* the contents of which are incorporated herein by reference in its entirety.

Each layer of the OSI model 66 performs a specific data communications task, a service to and for the layer that precedes it (e.g., the network layer 76 provides a service for the transport layer 74). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

Actual data flow between two nodes (e.g., MN 10 and CN 26) is from top 82 to bottom 84 in the source node, across the communications line, and then from bottom 84 to top 82 in the destination node. Each time that user application data passes downward from one layer to the next layer in the same node more processing information is added. When that information is removed and processed by the peer layer in the other node, it causes various tasks (error correction, flow control, etc.) to be performed.

The ISO has specifically defined all seven layers, which are summarized below in the order in which the data actually flows as they leave the source node.

Layer 7, the application layer 68, provides for a user application to interface with the OSI application layer. And as indicated above, the OSI application layer can have a corresponding peer layer in another node communicating with the application layer.

Layer 6, the presentation layer 70, makes sure the user information is in a format (i.e., syntax or sequence of ones and zeros) the destination node can understand or interpret.

Layer 5, the session layer 72, provides synchronization control of data between the nodes (i.e., makes sure the bit configurations that pass through layer 5 at the source are the same as those that pass through layer 5 at the destination).

Layer 4, the transport layer 74, ensures that an end-to-end connection has been established between the two nodes and is often reliable (i.e., layer 4 at the destination confirms the request for a connection, so to speak, that it has received from layer 4 at the source node).

Layer 3, the network layer 76, provides routing and relaying of data through the network (among other things, at layer 3 on the outbound side an address gets placed on the envelope which is then read by layer 3 at the destination).

Layer 2, the data link layer 78, includes flow control of data as messages pass down through this layer in one node and up through the peer layer in the other node.

Layer 1, the physical interface layer 80, includes the ways in which data communications equipment is connected mechanically and electrically, and the means by which the data moves across those physical connections from layer 1 at the source node to layer 1 at the destination node.

FIG. 5 illustrates a comparison 86 of the OSI functionality of the MN 10 and/or CN 26 in accordance with embodiments of the present invention, and the generic OSI model. More particularly, FIG. 5 illustrates where the Internet Protocol (IP) network layer 94 fits in the OSI seven layer model 88. As shown, the transport layer 90 provides data connection services to applications and may contain mechanisms that guarantee that data is delivered error-free, without omissions and in sequence. The transport layer in the TCP/IP model 92 sends segments by passing them to the IP layer, which routes them to the destination. The transport layer accepts incoming segments from the IP layer, determines which application is the recipient, and passes the data to that application in the order in which it was sent.

Thus, the IP layer 94 performs network layer 96 functions and routes data between nodes (e.g., MN 10 and CN 26). Data may traverse a single link or may be relayed across several links in an IP network 16. Data is carried in units called datagrams, which include an IP header that contains layer 3 98 addressing information. Routers examine the destination address in the IP header in order to direct datagrams to their destinations. The IP layer is called connectionless because every datagram is routed independently and the IP layer does not guarantee reliable or in-sequence delivery of datagrams. The IP layer routes its traffic without caring which application-to-application interaction a particular datagram belongs to.

The Transmission Control Protocol (TCP) layer 90 provides a reliable data connection between devices using TCP/IP protocols. The TCP layer operates on top of the IP layer 94 that is used for packing the data to data packets, sometimes referred to as datagrams, and for transmitting the datagrams across the data link layer and underlying network via physical layer 100. The data link layer can operate in accordance with any of a number of different protocols, such as the Point-to-Point Protocol (PPP). As will be appreciated, the IP protocol doesn't contain any flow control or retransmission mechanisms. That is why the TCP layer 90 is typically used on top of the IP layer 94. In this regard, TCP protocols provide acknowledgments for detecting lost data packets.

Reference is now made to FIG. 6, which illustrates a control flow diagram of a method of handing off a MN 10 from a current, anchor FA 20*a* to a new, target FA 20*b*, such as during a communication session-between the MN and a CN 26. As explained herein, the MN is handed off from an anchor FA to a target FA. It should be understood, however, that the MN can be equally handed off from an anchor HA 18 to a target FA, or alternatively from an anchor FA to a target HA, without departing from the spirit and scope of the present invention. Also, as explained below, the method of FIG. 6 is particularly applicable to handing off a MN from a slow-access network to the same type of slow-access network. In this regard, the method of FIG. 6 will be explained in conjunction with handing off a MN from an anchor PDSN (i.e., anchor FA) in a CDMA network to a target PDSN (i e., target FA), in the same or a different CDMA network. It should be understood, however, that the method of FIG. 6 can be equally applicable to handing off a MN from any of a number of other slow-access networks to the same type of slow-access networks, without departing from the spirit and scope of the present invention.

As shown in FIG. 6, a method of handing off a MN 10 from an anchor FA 20*a* to a target FA 20*b* in accordance with one embodiment of the present invention includes establishing a tunnel between the target FA and the anchor FA. More particularly, the BS 14 (i.e., an anchor BS 14*a*) currently serving the MN can initiate a handoff from the anchor FA to the target FA by instructing the MN to initiate a physical-layer (i.e., layer 1) handoff from the anchor BS to a target BS 14*b* that can thereafter serve the MN, as such is well known to those skilled in the art. Then, during the physical-layer handoff, a tunnel can be established between the target FA and the anchor FA through signaling between the respective BS and the relevant network components. In CDMA, for example, the a tunnel can be established between the target PDSN (i.e., target FA) and the anchor PDSN (i.e., anchor FA) by establishing a PDSN-to-PDSN (P-P) connection between the target PDSN and the anchor PDSN in accordance with a fast handoff technique whereby the anchor PDSN is not reachable from the target packet control function (PCF), which can be integrated into the target BS 14. For more information on such a technique, see generally Third Generation Partnership Project 2 (3GPP2) specification 3GPP2 A.S0013-A v2.0.1, entitled: *Interoperability Specification (IOS) for cdma2000: Access Network Interfaces—Part 3 Features,* and particularly section 3.19.4.2. The contents of 3GPP2 A.S0013-A v2.0.1 are hereby incorporated by reference in its entirety.

As shown in FIG. 6, after establishing the tunnel between the target FA 20b and the anchor FA 20a, data traffic can flow from the MN 10 through the target FA and the tunnel to the anchor FA. In this regard, the link-layer (i.e., layer 2) termination point is still the anchor FA. For example, after establishing the P-P connection between the target PDSN (i.e., target FA) and the anchor PDSN (i.e., anchor FA) in the same or different CDMA networks, PPP data frames can be tunneled through the target PDSN to the anchor PDSN, with the MN continuing to have the original care-of IP address assigned to the MN by the anchor PDSN. At this point, the link-layer and IP-layer (i.e., layer 3) handoff has not yet been performed. By flowing data traffic through the tunnel between the target FA and the anchor FA, handoff of the MN can continue without causing delay due to link-layer and IP-layer signaling, during which the MN would otherwise be unable to send or receive data packets.

Thus, after the tunnel is established, to perform the link-layer and IP-layer handoff without introducing much, if any, delay or packet loss, the anchor FA 20a can transfer link-layer (i.e., layer 2) context information for the MN 10 to the target FA 20b, the link-layer context information including one or more parameters required to set up a link-layer connection between the MN and a FA. Thus, the target FA can thereafter maintain the link-layer context information and initiate the link-layer stack in preparation to receive a data packet from the CN 26 intended for the MN. Since the MN is being handed off from an anchor FA in a slow-access network to a target FA in the same type of slow-access network, the link-layer context information in the anchor FA can be the same as that in the target FA. Thus, the link-layer context information need not be re-negotiated during the handoff, as is required in conventional MIP handoff techniques.

More particularly with respect to CDMA, for example, after the P-P interface is established, the anchor PDSN (i.e., anchor FA 20a) can transfer the PPP context information to the target PDSN (i.e., target FA 20b). In PPP, for example, the context information can include link control protocol (LCP) configuration options such as the maximum reserve units, authentication protocol, quality protocol, magic number, protocol field compression, and address and control field compression. For more information on such context information, see IETF (Internet Engineering Task Force) Request for Comments document RFC 1661, entitled: *The Point-to-Point Protocol (PPP)* (July 1994), the contents of which are also hereby incorporated by reference in its entirety.

As will be appreciated by those skilled in the art, in MIP the PPP negotiation process does not require an IP address assignment to the MN 10, or authentication between the PDSN (i.e., FA 20) and MN 10. The parameters exchanged during PPP negotiation are static and, as such, there is no need to negotiate the PPP session again when the PPP end point switches from the anchor PDSN (i.e., anchor FA 20a) to the target PDSN (i.e., target FA 20b). The PPP context can be transferred in any of a number of different manners, such as in multiple messages so as to simulate the PPP negotiation since the PPP stack is state aware.

After transferring the link-layer (i.e., layer 2) context information to the target FA 20b, the anchor FA 20a can send the MN 10 information regarding the target FA such that the MN can thereafter register with the target FA. In one embodiment, for example, the anchor FA can send the MN a proxy router advertisement message which is defined in IETF Internet Draft draft-ietf-mobileip-fast-mipv6-08.txt, entitled: *Fast Handovers for MIPv6* (Oct. 10, 2003), the contents of which are hereby incorporated by reference in its entirety. As defined by the IETF Internet Draft, the proxy router advertisement message is based upon the agent advertisement message, defined in IETF Request for Comments document RFC 3220, entitled: *IP Mobility Support for IPv4* (January 2002), the contents of which are also hereby incorporated by reference in its entirety. In this regard, the proxy router advertisement message can include a mobility agent advertisement extension having a care-of address (i.e., IP address) of the target FA.

After receiving the information regarding the target FA 20b, such as after receiving the proxy router advertisement message, the MN 10 can perform MIP registration with the target FA based on the information (e.g., care-of address) received from the anchor FA 20a. In this regard, the MN can send a MIP registration request to the target FA. As will be appreciated, however, the anchor FA first receives the MIP registration request because the anchor FA is the end point of the current link-layer (i.e., layer 2) connection. Thus, upon receipt, the anchor FA can route the MIP registration request to the target FA to initiate the MN registering with the target FA.

After receiving the MIP registration request, the target FA 20b can process the registration request and relay the request to the HA 18 of the MN 10 to thereby inform the HA of the registration request, and information regarding the target FA including the care-of address of the target FA. When the various entities operate in accordance with IPv4 (IP version 4), the HA can then add the necessary information, including the target FA care-of address to its routing table for the MN, approve the request, and send a registration response back to the MN via the target FA. In contrast, when the entities operate in accordance with IPv6 (IP version 6), the HA can approve the request, and send a registration response back to the MN, which can then send a binding update to the HA or the CN 26. The HA can then add the necessary information to its routing table for the MN. For more information on such MIP registration processes, see IETF RFC 3220 and Internet Draft draft-ietf-mobileip-fast-mipv6-08.txt.

As will be appreciated, by registering the MN 10 with the target FA 20, future incoming packets to the MN can be routed to the target FA 20b and then to the MN, as opposed to the anchor FA 20a and then the MN. Thus, when the first incoming data packet from the CN 26 reaches the target FA, the target FA can activate the link-layer (i.e., layer 2) context information previously transferred to the target FA, and forward the incoming data packet to the MN in accordance with the link-layer context information. Thus, data packets need not pass from the target FA, through the tunnel between the target FA and anchor FA, and from the anchor FA to the MN, as before. It should be understood, however, that in various instances the link-layer context information in the anchor FA may change before the target FA actives the link-layer context information. In such instances, the anchor FA can, if so desired, transfer the updated link-layer (i.e., layer 2) context information to the target FA such that the target FA has the up-to-date context information when activating the same to forward the incoming data packet to the MN.

Although incoming data packets can be forwarded from the target FA 20b to the MN 10 without first passing through the tunnel between the target FA and the anchor FA 20a, data packets in the reverse direction may still pass through the tunnel, and from the tunnel to the CN 26. Thus, to begin forwarding data packets independent of the tunnel and the anchor FA, the target FA can forward outgoing packets from the MN to the CN in accordance with the link-layer context information previously activated by the target FA.

As will be appreciated, in various instances the MN 10 may be handed over during the transmission of data from the MN to the CN 26. Thus, to avoid the loss of packets that may otherwise occur by moving the communication path from the tunnel between the target FA 20b and the anchor FA 20a to directly from the target FA, the target FA can, but need not, monitor outgoing data packets while continuing to pass the outgoing data packets through the tunnel to the anchor FA, and from the anchor FA to the CN. By monitoring the outgoing data packets, then, the target FA can identify a packet that includes a payload containing framing information (e.g., framing byte) of a link-layer (i.e., layer 2) frame, the framing information representing the boundary of a link-layer frame. With respect to CDMA, for example, to determine when to stop forwarding generic routing encapsulation (GRE) packets to the anchor PDSN (i.e., anchor FA) through the P-P connection between the anchor PDSN and the target PDSN, the target PDSN can monitor the payload, or Radio Link Protocol (RLP) frame, of the GRE packet. After identifying a packet including framing information, the target FA 20b can separate the payload of the packet into two portions, the first portion ending just before the framing information and the other portion including the remainder of the packet. The first portion, representing the end of a data transmission, can then be tunneled to the anchor FA 20a (i.e., passed to the anchor FA through the tunnel), and from the anchor FA to the CN 26. The second portion, representing the beginning of a subsequent data transmission, can then be forwarded to the CN independent of the anchor FA and the tunnel, and in accordance with the link-layer context information previously activated by the target FA. For example, when the target PDSN (i.e., target FA) identifies a framing byte of a PPP frame (i.e., 01111110-7E), the target PDSN can separate the payload into two portions, one portion ends just before the framing byte and is tunneled to the anchor PDSN (i.e., anchor FA), with the other portion fed into the activated PPP (i.e., link-layer) stack.

Thereafter, subsequent outgoing data packets from the MN 10 can be forwarded from the target FA 20b to the CN 26 without being tunneled to the anchor FA 20a. And since the tunnel between the target FA and the anchor FA is no longer required to pass data packets between the MN and the CN, the target FA and/or anchor FA can tear down or otherwise close the tunnel (e.g., P-P interface).

Reference is now made to FIG. 7, which illustrates a control flow diagram of an alternative method of handing off a MN 10 from a current, anchor FA 20a to a new, target FA 20b, such as during a communication session between the MN and a CN 26. As explained below, the method of FIG. 7 is particularly applicable to handing off a MN from a slow-access network to the same or different type of slow-access network. In this regard, the method of FIG. 7 will be explained in conjunction with handing off a MN from an anchor PDSN (i.e., anchor FA) in a CDMA network to a target PDSN (i.e., target FA), in the same or a different CDMA network. It should be understood, however, that the method of FIG. 7 can be equally applicable to handing off a MN from any of a number of other slow-access networks to the same or different type of slow-access networks, without departing from the spirit and scope of the present invention.

As shown in FIG. 7, a method of handing off a MN 10 from an anchor FA 20a to a target FA 20b in accordance with another embodiment of the present invention includes establishing a tunnel between the target FA and the anchor FA. The tunnel can be established in any of a number of different manners, but in one typical embodiment, the tunnel is established in the same manner as the embodiment of FIG. 6. In this regard, as with the method of FIG. 6, in the method of FIG. 7, after establishing the tunnel between the target FA and the anchor FA, data traffic can flow from the MN 10 through the target FA and the tunnel to the anchor FA, with the link-layer (i.e., layer 2) termination point remaining the anchor FA. For handoff from one slow-access network to a different slow-access network, this typically assumes that the MN continues to operate in accordance with the previous link-layer protocol even though the physical layer has been handed off to the new access network including the target FA. Again, by flowing data traffic through the tunnel between the target FA and the anchor FA, handoff of the MN can continue without causing delay due to link-layer and IP-layer signaling, during which the MN would otherwise be unable to send or receive data packets.

In contrast to the method of FIG. 6, link-layer (i.e., layer 2) context information need not be transferred from the anchor FA to the target FA after establishing the tunnel between the target FA and the anchor FA, particularly in those instances where the MN is being handed off from a one slow-access network to a different type of slow-access network (e.g., CDMA to GPRS). In accordance with the method of FIG. 7, after establishing the tunnel between the target FA 20b and the anchor FA 20a, the anchor FA can send the MN 10 information regarding the target FA such that the MN can thereafter register with the target FA. In one embodiment, for example, the anchor FA can send the MN a proxy router advertisement message that, similar to before, includes a mobility agent advertisement extension having a care-of address (i.e., IP address) of the target FA. Before or concurrent with the proxy router advertisement message, however, a new physical-layer (i.e., layer 1) connection between the MN and the target BS 14b can be established. More particularly, for example, the anchor FA can instruct the MN to establish a new physical-layer connection with the target BS and a new link-layer (i.e., layer 2) connection with the target FA. The anchor FA can instruct the MN in any of a number of different manners including, for example, introducing and setting a flag bit (e.g., P bit) in the proxy router advertisement message, the MN being configured to interpret the setting of the flag bit as such an instruction.

Thus, after receiving the proxy router advertisement message, the MN 10 can defer registering with the target FA, which would occur through the anchor FA as in the method of FIG. 6. Instead, the MN and target BS 14b can establish a new physical-layer (i.e., layer 1) connection. With respect to CDMA, for example, when the MN receives the proxy router advertisement message, the MN can recognize, from the set P bit, that the target PDSN (i.e., target FA 20b) supports a P-P interface. Thus, while maintaining the existing PPP connection and the existing MIP binding to the anchor FA, the MN can establish a new physical-layer connection with the target BS in accordance with the CDMA service option (SO) 33. In setting up the new physical-layer connection, the MN can utilize a new service reference identifier (SR_ID) associated with the new physical-layer connection such that, from the CDMA MUX layer, the SR_ID can distinguish PPP frames from the different RLP instances. For more information on SO 33, see Telecommunications Industry Association/Electronic Industries Alliance specification TIA/EIA/IS-707-A-3, entitled *Data Services Option Standard for Spread Spectrum Systems— Addendum* 3: *cdma*2000 High Speed Packet Data Device Option 33 (February 2003).

In implementing the new physical-layer connection, the target BS 14*b* can follow the conventional process of establishing a new packet data service instance, including initiating a new A8/A9 interface with the target PCF (which can be integrated with the target BS) with the new SR_ID while not changing the status of the existing packet data service instance (with the original SR_ID). In addition, the target PCF can establish a new A10 connection with the target PDSN (i.e., target FA 20*b*), including sending an A11 registration request to the target PDSN (the S bit in the request not being set to 1, thereby notifying the target PDSN that the A11 registration request is a new request and not associated with the existing P-P interface). As will be appreciated by those skilled in the art, the A9 interface can provide for signaling to initiate establishment and release of an A8 connection for packet data services. Similar to the A9 interface, the A11 interface can provide signaling to request establishment, refresh, update and release of an A10 connection for packet data services. The A8 interface can provide the user traffic path between the target BS and the PCF. And the A10 interface can provide the user traffic path between the target PCF and the target PDSN. For more information on such a process of establishing a new packet data service instance, see generally 3GPP2 specification 3GPP2 A.S0013-A v2.0.1, and particularly section 3.17.4.1.

Irrespective of exactly how the physical-layer (i.e., layer 1) connection is established between the MN 10 and the target BS 14*b*, a new link-layer (i.e., layer 2) connection between the MN and the target FA 20*b* can thereafter be established. More particularly, for example, the MN and target FA can establish a new link-layer connection with the target FA such that, during establishment, link-layer context information can be negotiated between the MN and the target FA. In instances of handing off from a slow-access network to the same type of slow-access network, and when the link-layer context information is transferred from the anchor FA 20*a* to the target FA, however, the link-layer context information need not be re-negotiated between the MN and the target FA. In CDMA networks, for example, after the new data call is completed (i.e., establishing the physical-layer connection with the target BS), the MN can negotiate a new PPP session with the target PDSN (i.e., target FA). In the target PDSN, since the S bit in the previous A11 registration request was not set, the target PDSN can recognize that the new SR_ID is associated with a new P-P interface, and not the existing P-P interface. The target PDSN should therefore permit establishment of a PPP connection with the MN. And when the new PPP connection is established, QoS negotiation can also be performed, thereby triggering establishment of an auxiliary service instance.

After the link-layer connection is established between the MN 10 and the target FA 20*b*, the MN can perform MIP registration with the target FA based on the information (e.g., care-of address) received from the anchor FA 20*a* in the proxy router advertisement message. Like in the method of FIG. 6, the MN can send a MIP registration request to the target FA. In contrast to the method of FIG. 6, however, the MN can send the MIP registration request to the target FA directly over the new link-layer connection, without the anchor FA first receiving the MIP registration request as the end point of the other link-layer (i.e., layer 2) connection. Similar to before, upon receipt of the MIP registration request, the target FA can process the registration request and relay the request to the HA 18 of the MN 10 to thereby inform the HA of the registration request, and information regarding the target FA including the care of address of the target FA. Also in a manner similar to before, when the various entities operate in accordance with IPv4 (IP version 4), the HA can add the necessary information (e.g., target FA care-of address, etc.) to its routing table for the MN, approve the request, and send a registration response back to the MN via the target FA. But when the entities operate in accordance with IPv6 (IP version 6), the HA can approve the request, and send a registration response back to the MN, which can then send a binding update to the HA or the CN 26. The HA can then add the necessary information to its routing table for the MN.

After the MN registers with the target FA 20, future incoming packets to the MN can be routed to the target FA 20*b* and then to the MN, as opposed to the anchor FA 20*a* and then the MN. Thus, when the first incoming data packet from the CN 26 reaches the target FA, the target FA can activate the link-layer (i.e., layer 2) context information previously negotiated during establishment of the new link-layer connection between the MN and the target FA. The target FA can then forward the data packet to the MN in accordance with the link-layer context information. Thus, data packets need not pass from the target FA, through the tunnel between the target FA and anchor FA, and from the anchor FA to the MN, as before.

Like incoming data packets, outgoing data packets in the reverse direction can be sent directly to the target FA 20*b* across the newly established link-layer (i.e., layer 2) connection between the MN 10 and the target FA, and from the target FA to the CN 26. Thus, to begin transferring packets independent of the tunnel and the anchor FA, the target FA can pass outgoing packets from the MN to the CN in accordance with the link-layer context information previously activated by the target FA. Because the outgoing packets are sent directly across the newly established link-layer, the target FA need not continue to pass outgoing data packets through the tunnel to the anchor FA 20*a* until the target FA can identify the boundary of a link-layer frame, as is the case in the method of FIG. 6. Also, after receiving a data packet from the MN over the new link-layer connection, the target FA can be identify that the MIP registration was successful and tear down or otherwise close the tunnel (e.g., P-P interface) between the target FA and the anchor FA since the tunnel is no longer required to pass data packets between the MN and the CN.

According to one aspect of the present invention, all or a portion of the system of the present invention, such all or portions of the MN 10, anchor FA 20*a* and target FA 20*b*, generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 6 and 7 are control flow diagrams of methods, systems and program products according to the invention. It will be understood that each block or step of the control flow diagrams, and combinations of blocks in the control flow diagrams, can be implemented by computer program instructions. These computer program instructions may be loaded onto a computer or other programmable apparatus to produce a machine, such that the instructions which execute on the computer or other programmable apparatus create means for implementing the functions specified in the control flow diagrams block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagrams block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagrams block(s) or step(s).

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for handing off a mobile node, the system comprising:
   a mobile node configured to communicate with an anchor agent, and configured to be handed off from the anchor agent;
   a target agent configured to establish a tunnel between the target agent and the anchor agent such that at least one data packet sent between the mobile node and a correspondent node passes between the target agent and the anchor agent through the tunnel; and
   a correspondent node configured to communicate with the mobile node,
   wherein the mobile node is configured to register with the target agent to thereby bind the mobile node to the target agent such that at least one data packet sent between the mobile node and the correspondent node passes through the target agent to the correspondent node independent of the anchor agent and the tunnel, and
   wherein the target agent is configured to close the tunnel between the target agent and the anchor agent after the mobile node registers with the target agent,
   wherein the target agent is configured to receive an outgoing data packet from the mobile node, the outgoing data packet being received after the mobile node registers with the target agent, and wherein the target agent is configured to forward the data packet to the correspondent node independent of the anchor agent and the tunnel, and in accordance with a link-layer context at the target agent, the link-layer context having been activated by the target agent,
   wherein the target agent is configured to receive at least one outgoing data packet, wherein the target agent is configured to forward the data packet by passing the at least one data packet through the tunnel to the anchor agent such that the anchor agent is configured to thereafter forward the at least one data packet to the correspondent node, the at least one data packet being passed through the tunnel until the target agent identifies a data packet including framing information representing a boundary of a link-layer frame, and thereafter passing a first portion of the identified data packet to the anchor agent through the tunnel such that the anchor agent can thereafter forward the first portion to the correspondent node, and passing a second portion of the identified data packet to the correspondent node independent of the anchor agent and the tunnel, wherein the first portion represents an end of a data transmission and the second portion represents a beginning of a subsequent data transmission, and wherein the target agent is configured to close the tunnel after passing the first portion of the identified data packet to the anchor agent through the tunnel.

2. A system according to claim 1, wherein the target agent is configured to receive an incoming data packet from the correspondent node independent of the anchor agent, the incoming data packet being received after the mobile node registers with the target agent, wherein the target agent is configured to activate a link-layer context, and thereafter forwarding the data packet to the mobile node.

3. A system according to claim 1, wherein the target agent is further configured to receive link-layer context information for the mobile node from the anchor agent, the link-layer context information being received across the tunnel and before the mobile node registers with the target agent.

4. A system according to claim 1, wherein the mobile node is configured to establish a link-layer connection with the target agent, the link-layer connection being established before the mobile node registers with the target agent, and wherein the mobile node is configured to negotiate link-layer context information with the target agent during establishment of the link-layer connection.

5. An apparatus comprising:
   a processor configured to communicate with an anchor agent, and configured to be handed off from the anchor agent to a target agent, wherein the processor is configured to be handed off such that the target agent and anchor agent are configured to establish a tunnel therebetween such that at least one data packet sent between the apparatus and a correspondent node passes between the target agent and the anchor agent through the tunnel,
   wherein the processor is configured to register the apparatus with the target agent to thereby bind the apparatus to the target agent such that at least one data packet sent between the apparatus and the correspondent node passes through the target agent to the correspondent node independent of the anchor agent and the tunnel, and such that the target agent thereafter closes the tunnel between the target agent and the anchor agent, wherein the processor is configured to send an outgoing data packet to the target agent, the outgoing data packet being received after the processor registers the apparatus with the target agent, and wherein the processor is configured to send the outgoing data packet to the target agent such that the target agent is configured to forward the data packet to the correspondent node independent of the anchor agent and the tunnel, and in accordance with a link-layer context at the target agent, the link-layer context having been activated at the target, wherein the processor is configured to send at least one outgoing data packet to the target agent, wherein the processor is configured to send the outgoing data packet to the target agent such that the target agent is configured to forward the data packet by passing the at least one data packet through the tunnel to the anchor agent such that the anchor agent is configured to thereafter forward the at least one data packet to the correspondent node, the at least one data packet being passed through the tunnel until the target agent identifies a data packet including framing information representing a boundary of a link-layer frame, and thereafter passing a first portion of the identified data packet to the anchor agent through the tunnel such that the anchor agent can thereafter forward the first portion to the correspondent node, and passing a second portion of the identified data packet to the correspondent node independent of the anchor agent and the tunnel, wherein the first portion represents an end of a data transmission and the second portion represents a beginning of a subsequent data transmission, and wherein the processor is configured to send the outgoing data packet to the target agent such that the target agent is configured to close the tunnel after passing the first portion of the identified data packet to the anchor agent through the tunnel.

6. An apparatus according to claim 5, wherein the processor is configured to register the apparatus with the target agent such that the target agent is configured to receive an incoming data packet from the correspondent node independent of the anchor agent, and such that the target agent is configured to activate a link-layer context at the target agent, and thereafter forwarding the data packet to the apparatus.

7. An apparatus according to claim 5, wherein the processor is configured to be handed off such that the target agent is configured to receive link-layer context information for the apparatus from the anchor agent, the link-layer context information being received across the tunnel and before the processor registers the apparatus with the target agent.

8. An apparatus according to claim 5, wherein the processor is further configured to establish a link-layer connection with the target agent, the link-layer connection being established before registering the apparatus with the target agent, and wherein the processor is configured to negotiate link-layer context information with the target agent during establishment of the link-layer connection and before the target agent closes the tunnel.

9. An apparatus comprising:
a processor configured to establish a tunnel between the apparatus and an anchor agent such that at least one data packet sent between a mobile node and a correspondent node passes between the apparatus and the anchor agent through the tunnel, wherein the processor is also configured to register the mobile node to thereby bind the mobile node to the apparatus such that at least one data packet sent between the mobile node and the correspondent node passes through the apparatus to the correspondent node independent of the anchor agent and the tunnel, and wherein the processor is thereafter configured to close the tunnel between the apparatus and the anchor agent, wherein the processor is further configured to receive an outgoing data packet from the mobile node, the outgoing data packet being received after registering the mobile node, and wherein the processor is configured to forward the data packet to the correspondent node independent of the anchor agent and the tunnel, and in accordance with a link-layer context having been activated by the processor, wherein the processor is configured to receive at least one outgoing data packet, wherein the processor is configured to forward the at least one data packet by passing the at least one data packet through the tunnel to the anchor agent such that the anchor agent is configured to thereafter forward the at least one data packet to the correspondent node, the at least one data packet being passed through the tunnel until the processor identifies a data packet including framing information representing a boundary of a link-layer frame, and thereafter passing a first portion of the identified data packet to the anchor agent through the tunnel such that the anchor agent can thereafter forward the first portion to the correspondent node, and passing a second portion of the identified data packet to the correspondent node independent of the anchor agent and the tunnel, wherein the first portion represents an end of a data transmission and the second portion represents a beginning of a subsequent data transmission, and wherein the processor is configured to close the tunnel after passing the first portion of the identified data packet to the anchor agent through the tunnel.

10. An apparatus according to claim 9, wherein the processor is further configured to receive an incoming data packet from the correspondent node independent of the anchor agent, the incoming data packet being received after registering the mobile node, and wherein the processor is configured to activate a link-layer context, and thereafter forward the data packet to the mobile node in accordance with the activated link-layer context.

11. An apparatus according to claim 9, wherein the processor is further configured to receive link-layer context information for the mobile node from the anchor agent, the link-layer context information being received across the tunnel and before registering the mobile node.

12. An apparatus according to claim 9, wherein the processor is further configured to establish a link-layer connection with the mobile node, the link-layer connection being established before registering the mobile node, and wherein the processor is configured to negotiate link-layer context information with the mobile node during establishment of the link-layer connection.

13. A method of handing off a mobile node from an anchor agent to a target agent, the method comprising:
establishing a tunnel between, the target agent and the anchor agent such that at least one data packet sent between the mobile node and a correspondent node passes between the target agent and the anchor agent through the tunnel;

registering the mobile node with the target agent to thereby bind the mobile node to the target agent such that at least one data packet sent between the mobile node and the correspondent node passes through the target agent to the correspondent node independent of the anchor agent and the tunnel; and thereafter, receiving an outgoing data packet at the target agent from the mobile node, the outgoing data packet being received after registering the mobile node with the target agent; and forwarding the data packet to the correspondent node from the target agent independent of the anchor agent and the tunnel, and in accordance with a link-lager context at the target agent, the link-layer context having been activated at the target agent; and closing the tunnel between the target agent and the anchor agent, wherein receiving an outgoing data packet comprises receiving at least one outgoing data packet, wherein forwarding the data packet comprises:

passing the at least one data packet from the target agent through the tunnel to the anchor agent such that the anchor agent is configured to thereafter forward the at least one data packet to the correspondent node, the at least one data packet being passed through the tunnel until a data packet including framing information representing a boundary of a link-layer frame is identified; and thereafter passing a first portion of the identified data packet from the target agent to the anchor agent through the tunnel such that the anchor agent can thereafter forward the first portion to the correspondent node, the first portion representing an end of a data transmission;

passing a second portion of the identified data packet from the target agent to the correspondent node independent of the anchor agent and the tunnel, the second portion representing a beginning of a subsequent data transmission, and wherein closing the tunnel comprises closing the tunnel after passing the first portion of the identified data packet from the target agent to the anchor agent through the tunnel.

14. A method according to claim 13 comprising:

receiving an incoming data packet at the target agent from the correspondent node independent of the anchor agent, the incoming data packet being received after registering the mobile node with the target agent;

activating a link-layer context at the target agent; and forwarding the data packet to the mobile node from the target agent.

15. A method according to claim 13 further comprising:

receiving link-layer context information for the mobile node at the target agent from the anchor agent, the link-layer context information being received across the tunnel and before registering the mobile node with the target agent.

16. A method according to claim 13 further comprising:

establishing a link-layer connection with the mobile node at the target agent, the link-layer connection being established before registering the mobile node with the target agent, wherein establishing the link-layer connection includes negotiating link-layer context information between the mobile node and the target agent.

* * * * *

UNITED STATES PATENT AND TRADEMARK OFFICE
CERTIFICATE OF CORRECTION

| | | |
|---|---|---|
| PATENT NO. | : 7,333,454 B2 | Page 1 of 1 |
| APPLICATION NO. | : 10/880385 | |
| DATED | : February 19, 2008 | |
| INVENTOR(S) | : Yang et al. | |

It is certified that error appears in the above-identified patent and that said Letters Patent is hereby corrected as shown below:

<u>Column 21,</u>

Line 13, "link-lager" should read --link-layer--.

Signed and Sealed this

Eighth Day of July, 2008

JON W. DUDAS
*Director of the United States Patent and Trademark Office*